United States Patent

Hoyer

[15] 3,649,070

[45] Mar. 14, 1972

[54] SUN VISOR

[72] Inventor: Ekkehard Hoyer, Wolfsburg, Germany

[73] Assignee: Volkswagenwerk Akt.

[22] Filed: June 30, 1969

[21] Appl. No.: 837,593

[52] U.S. Cl. .......................................................296/97 H
[51] Int. Cl. ................................................................B60j 3/00
[58] Field of Search ..........................296/97, 28, 84 K, 97 H;
280/150 B; 264/45

[56] References Cited

UNITED STATES PATENTS

| 3,301,927 | 1/1967 | Exley | 264/45 |
| 3,405,969 | 10/1968 | Creel | 296/97 H |
| 3,542,416 | 11/1970 | Nelson | 296/97 H |

FOREIGN PATENTS OR APPLICATIONS

| 1,472,560 | 1/1967 | France | 296/28 |
| 1,002,461 | 8/1965 | Great Britain | 296/97 |

OTHER PUBLICATIONS

German Printed Application 1,163,176, 2/1964, Rosenke,

Primary Examiner—Benjamin Hersh
Assistant Examiner—John A. Pekar
Attorney—Watson, Cole, Grindle & Watson

[57] ABSTRACT

A hollow sun visor mounted on a tube-shaped holder having holes therein communicating with the interior of the visor through which a plastic material may be forced through the holder into the interior of the visor.

1 Claims, 1 Drawing Figure

Patented March 14, 1972 3,649,070
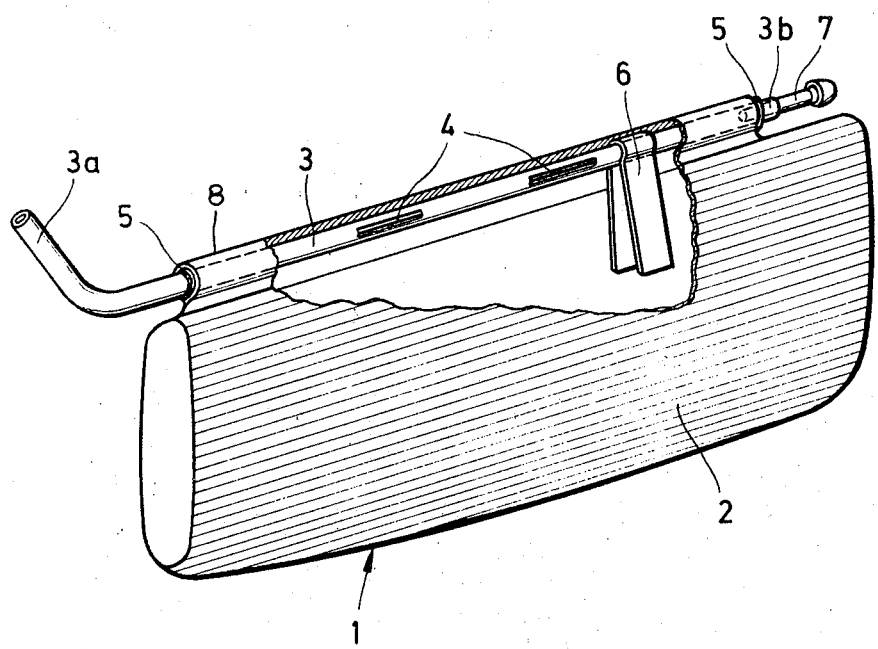
INVENTOR.
Ekkehard Hoyer
BY
Watson, Cole, Grindle & Watson
Attys.

SUN VISOR

This invention relates to a sun visor having a hollow rod for inflating the visor and serving for the reception of a holding mount at the upper edge.

In a sun visor of this type, shown for example in British Pat. No. 864,091, a bore which is connected with a hollow space in a hose by means of a channel serves exclusively for the blowing up of the visor. A fitting, holding, and swiveling member is inserted into the cooled visor only after completion of the finishing method and after withdrawal of a blowing mandrel. Since the coefficient of heat expansion for plastic is about 10 times higher than that of steel, it has been found necessary to provide very small tolerances for such member. Otherwise, extensive fitting operations are required for such member. If the visor fit is too slack, it will become even more loose if slightly heated by radiation from the sun or by the automobile heater and will therefore not be able to remain in its turned-up position. On the other hand, if the fit is too tight, it is possible that the bearing bore of the swiveling member will tear. Also, with the known sun visor, the cushioning effect desired for the prevention of injuries in the case of accidents will not be effectively achieved because the walls of the hollow hose used as a starting body during production is thinner in the lower area of the visor than at the top.

It is therefore an object of the invention to simplify the fabrication of the sun visor so that it can be manufactured more economically and simultaneously to increase its protective effect in the case of accidents. Such consists in the sun visor's having as its blowing mandrel a tube-shaped mounting which serves, by means of slits provided therealong facing the sun visor body, for the introduction of the compressed air as well as subsequently for the filling with a foam plastic to support the sun visor hollow space and which remains in the interior of the sun visor after completion.

A further object of the invention resides in the fact that it will be no longer necessary to exchange the blow tube against the holding axis after the blowing process. The mounting area will shrink directly onto the axle so that by a proper dimensioning of the thickness of the wall and of the diameter of the bearing as well as by shaping, for example by squeezing the sun visor off below the holding axis, one will be able to achieve an automatic locking of the axis in the mounting axle which will be sufficient for a wide temperature range. Beyond that and in a further object of the invention, additionally the possibility exists, which is of significance particularly in the case of a visor of every weight or in case of the use of the visor in high temperatures and in vehicles exposed to heavy vibration such as concussions, to increase the automatic locking by insertion of an inexpensive clamp placed on the swiveling axis or axle, the legs of which protrude into the hollow space of the body of the sun visor and are supported against the inner lateral surfaces of the body of the sun visor.

The advantage of the invention concerning fabrication thus lies in the saving of additional assembly and fitting operations and in a decrease in weight. The invention makes possible a fully automatic mass production with little expenditure of labor, labor time, and costs without subsequent manual labor. Simultaneously the cushioning effect of the visor will be increased by its being filled with a soft foam plastic material inserted in the most simple manner.

A process for the production of cushioned visors which deviates considerably from the invention and which visors consist of two outside plastic soft foils and an inside hard carrier made of plastic, for example, a rigid sheet or a rigid profile, and which is filled with plastic foam, constitute the object of prior U.S. Pat. No. 1,207,227. As compared thereto, the supporting hard carrier has been omitted with the present invention. In order to increase rigidity, the hollow visor body consisting of semi-rigid plastic and which is stable in shape per se contains exclusively foam plastic. A further lowering in cost results in the sun visor's being manufactured by way of the inexpensive blowing process from a plastic hose. Thus, the sun visor according to the invention and as compared to the visors known heretofore, shows in two respects that it is different in type and technical superiority.

Further objects will be apparent from the following description when considered in connection with the accompanying drawing which is a perspective view of the visor partly broken away and in section but, for the sake of clarity, without a showing of its plastic filling material. In the drawing the sun visor according to the invention has been shown partly in section and it consists of a sun visor 1 with a plastic body 2 defining an enclosed cavity which body as pivotally attached to a holder 3 by means of a tube-lile hinge element 8 provided along one edge of the plastic body. The holder 3 is attached above a window or windshield of the motor vehicle with one of its ends 3a. The holder 3 consists of a hollow tube which has been provided with slits 4 on its sides facing the body of the sun visor 2. The interior of the hinge element 8 is partially in communication with the body portion cavity and the interior of holder 3, through slits 4, is also in communication with the body portion cavity. First of all, compressed air is fed in at the connecting place or section 3a or at the opposite side 3b, in order to blow up the hollow oval hose 2 which constitutes the main body for the sun visor. Once the sun visor has reached its final shape, then holder 3 is used as a feed line for filling the hollow space in the body of the sun visor 2 with foam plastic material. The exit or outlet slits 4 therefore serve to permit air or foam plastic to enter into the hollow body of the sun visor 2. The holder 3, serving as a blow pipe, will remain on the sun visor even after completion of said sun visor 1, and snap rings 5 may be provided for sealing the holder with respect to hinge element 8 of the sun visor. A closing element 7, consisting of plastic material, closes the connection of the air or foam plastic line to the holder 3.

Also, a clamp 6 can be placed onto holder 3, which then will be inside the hollow body 2 and which will take care of the necessary automatic locking between sun visor body 2 and holder 3.

I claim:

1. A sun visor having a body portion defining an enclosed cavity, said body portion having a hinge element along one edge thereof, the interior of said hinge element being partially in communication with the interior of said body portion cavity, a hollow tube member disposed within said hinge element, said tube member having apertures in the wall thereof facing toward said body portion so as to provide communication between the interior of said tube and the interior of said body portion cavity, said hollow tube serving as a conduit for the introduction of compressed air and subsequently for the introduction of a foam plastic filling material into said body portion cavity, said filling material serving to support the walls of said body portion, and said tube member remaining fixed within said hinge element thereby also serving as a holder for the sun visor, said tube member being provided with a self-locking clamp, said clamp having legs projecting into said body portion cavity with said legs being supported by the inside surfaces of said body portion walls.

* * * * *